(12) United States Patent
Levine et al.

(10) Patent No.: US 8,987,647 B2
(45) Date of Patent: Mar. 24, 2015

(54) LOW POWER WIDE DYNAMIC RANGE CMOS IMAGER OUTPUT CIRCUIT HAVING A THRESHOLD DETECTOR TO SET A GAIN TO BE APPLIED BY A READOUT CIRCUITRY

(71) Applicant: SRI International, Menlo Park, CA (US)

(72) Inventors: Peter Alan Levine, West Windsor, NJ (US); Rui Zhu, Skillman, NJ (US); Thomas Richard Senko, Plainsboro, NJ (US); John Robertson Tower, Yardley, PA (US)

(73) Assignee: SRI International, Menlo Park, CA (US)

( * ) Notice: Subject to any disclaimer, the term of this patent is extended or adjusted under 35 U.S.C. 154(b) by 204 days.

(21) Appl. No.: 13/645,206

(22) Filed: Oct. 4, 2012

(65) Prior Publication Data

US 2014/0097328 A1 Apr. 10, 2014

(51) Int. Cl.
*H01L 27/00* (2006.01)
*H04N 5/235* (2006.01)
*H04N 5/243* (2006.01)

(52) U.S. Cl.
CPC ............. *H04N 5/2351* (2013.01); *H04N 5/243* (2013.01)
USPC .................... 250/208.1; 250/214 R

(58) Field of Classification Search
USPC ............... 250/208.1, 214 R, 214.1, 214 A; 348/296–311; 257/290–292, 440
See application file for complete search history.

(56) References Cited

U.S. PATENT DOCUMENTS 6,480,227 B1 * 11/2002 Yoneyama .................... 348/308
7,382,408 B2 * 6/2008 Rossi ............................ 348/308

* cited by examiner

*Primary Examiner* — Que T Le
(74) *Attorney, Agent, or Firm* — Marger Johnson & McCollom PC

(57) ABSTRACT

An imager has an array of pixels arranged in rows and columns, readout circuitry electrically coupled to the columns to receive signals from the pixels, the readout circuitry having at least one signal path with gain switching, and a threshold detector electrically coupled to the readout circuitry to set a gain to be applied by the readout circuitry.

16 Claims, 5 Drawing Sheets

LOW POWER WIDE DYNAMIC RANGE CMOS IMAGER OUTPUT CIRCUIT HAVING A THRESHOLD DETECTOR TO SET A GAIN TO BE APPLIED BY A READOUT CIRCUITRY

BACKGROUND

Image sensors generally convert optical images into electrical signals used by a processor to portray the image on a display device or present image data to a system. The image sensor may be designed and fabricated using a complementary metal oxide semiconductor (CMOS) process. CMOS image sensors have advantages because they result from relatively low cost and stable, well-known, manufacturing processes developed in manufacture of high volumes of CMOS-based devices used for digital and analog circuits. Some portions of a pixel may require some specialized processes which are also highly controllable.

CMOS image sensors are formed in arrays of pixels, where a pixel consists of the region within which individual detectors and detector support circuits reside. Typically, the pixels in a column share the output terminal. Row signals select the particular row of pixels within a column. Activating the row select switch connects the pixel to the column signal line which provides the pixel signal and electrical path to a column terminal point. The terminal point may be connected to circuits which condition the pixel-generated signal. Typically an on or off chip image processor receives the column output signals and uses them to generate an electrical signal representative of the taken image. The signal many be displayed or used as data. The display may take many forms and is of particular interest for mounted night vision devices.

High dynamic range provides advantages to night vision devices. They should provide good imaging information at very low levels of light, but still produce useful images at higher levels of light. Low light level imaging requires relatively high gain in the column processor to overcome backend noise such as an on-chip analog-to-digital converter (ADC). This can limit the signal to only a few thousand electrons before amplifier saturation. On the other hand high light imaging requires lower gain column processing and saturation can be for example tens of thousands of electrons. The noise floor is however higher for the low gain case. This high dynamic range requirement, for example from 1 electron noise floor to 30,000 electrons full scale gives rise to many challenges. One approach uses two analog-to-digital converters (ADC) for each column.

A first ADC resides in a high gain channel, having good immunity to noise but saturates at relatively low light levels. A second ADC resides in a low gain channel that allows much higher input signals, but suffers from relatively high noise. In this approach the outputs of the two ADCs for each column in the pixel array is spliced to form a single data signal with fewer bits and relatively high dynamic range. However, this approach results in more hardware and a larger package.

Another approach reduces the number of ADCs per column to one or less by using in-column nonlinear response to the pixel signal, a process that expands the output at lower light levels and compresses it at higher light levels. This provides relatively high dynamic range with lower costs and reduced hardware complexity. The desire for even higher dynamic range still exists. The particular compression used depends on the noise characteristics of the pixel and column processing circuits.

DETAILED DESCRIPTION OF THE EMBODIMENTS

Figure 1:
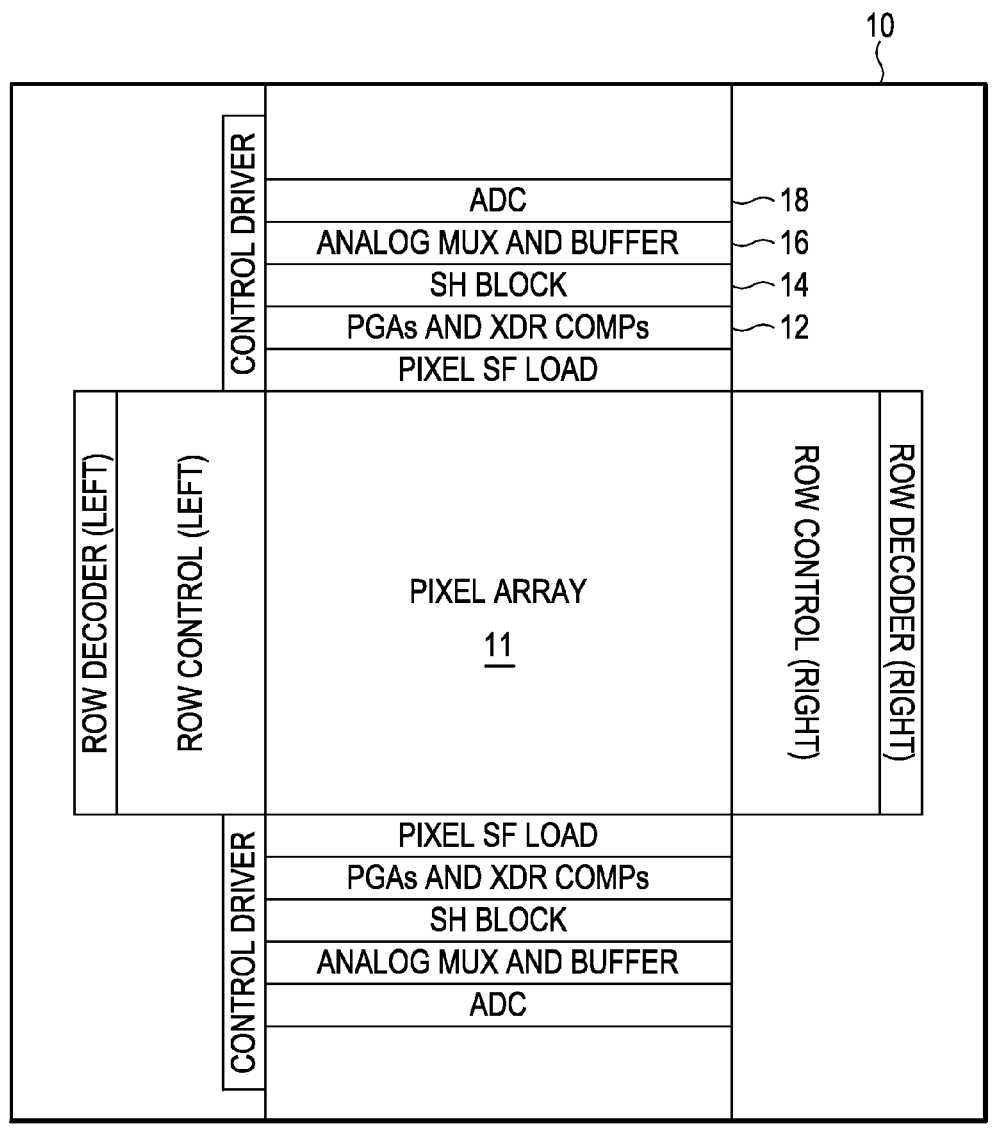
FIG. 1 shows an embodiment of a CMOS imager system.

FIG. 1 shows an embodiment of a CMOS imager system 10. The CMOS imager has a pixel array 11 of individual CMOS pixels typically arranged in an array of rows and columns. One should note that an array may consist of any number of elements arranged in an N×M matrix, where N and M may both equal one. Similar to memory arrays, or arrays of display pixels, the array has addressing circuitry that decodes addresses for the rows and columns, such as row and column decoders. However, this discussion will focus mostly on the readout circuitry.

Figure 2:
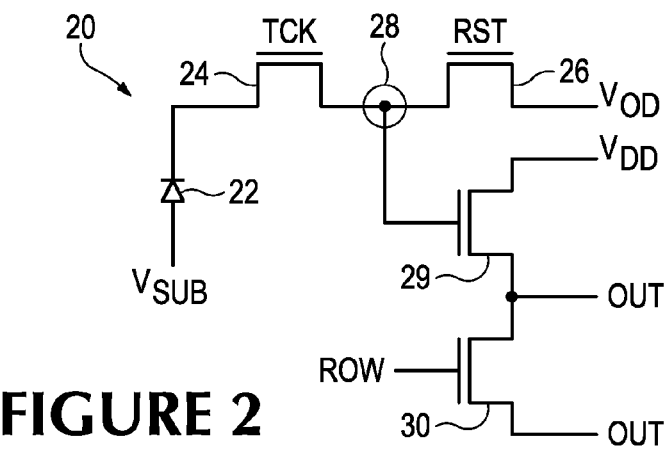
FIG. 2 shows an embodiment of a CMOS imager pixel.

When the sense elements are addressed, using row and column decoders, the output signal of the sense element is read out. The sense element collects signal charge in response to some stimulus such as optical stimulus. FIG. 2 shows an example of an individual pixel 20 from array 11 of FIG. 1.

As an overview, when the column signal circuits in a typical CMOS image sensor are ready to receive an electrical signal representative of the optical input stimulus, row select transistor 30 is turned on and sense node 28 is reset using transistor 26. After approximately half of the total pixel read out time signal charge is transferred from pinned photodiode (PPD) 22 via transfer gate transistor 24 to the sense node 28. Sense node 28 converts the charge signal to a voltage signal. Source follower 29 buffers the sense node 28 signal in order to drive the signal line OUT and subsequent circuits.

The architecture of a CMOS sensing element shown in FIG. 2 may sometimes be referred to as a 4T architecture. The element has a buried channel pinned photodiode (PPD) 22. The surface of the diode is generally voltage pinned to the substrate. The pinned photo diode has a buried channel region capable of charge storage which can be transferred to the sense node 28 via transfer gate transistor (TCK) 24. A reset transistor (RST) 26 is used to reset the sense node 24 to a reference level which for FIG. 2 is shown as VOD.

For a typical pixel read out cycle a reset signal applied to the electrode of the reset gate transistor causes the sense 28 node to have a voltage level equal to the reset voltage VOD. When the reset signal is taken off the reset transistor a reference voltage remains on the sense node 28 resulting what is generally know as the pixel reset shelf period. Turning on of transfer gate TCK causes charge stored in the buried channel region of the pinned photo diode 22 to transfer to the sense node 28. The sense node voltage changes in a nearly linear way with the quantity of signal charge transferred. This creates a second pixel period often called the signal shelf. When the ROW selection signal is applied to the row transistor 30, the buffered sense node signal OUT at the pixel source follower 29 output is connected to the output signal line and the pixel signal becomes readable by the readout circuitry. The pixel signal voltage change between the clamp and sample shelf is a rising or falling signal for increasing signal charge at the PPD, there is a rise or fall time associated with the pixel charge transfer was well as voltage domain circuits, which will be discussed in more detail further. For n-channel pixels increasing signal charge causes the sense node voltage to fall.

The signal may also require amplification. Returning to FIG. 1, the amplifiers and programmable gain amplifiers 12 receive the signals from the pixels and amplify or reduce them as needed. Referring to FIG. 1 gain is required to overcome noise generated in the circuits following amplification 12. The sample and hold (SH) blocks 14 samples the output signal and hold the samples until the buffer and multiplexer 16 are ready to transmit samples to the analog-to-digital converter 18.

Typically, sensing systems employ correlated double sampling (CDS) in which the readout circuitry reads the sense node at a first known condition. The system then applies a signal that allows the system to read the output of the pinned photodiode. The system can then subtract the read out at the known condition from the readout of the pinned photo diode signal to arrive at the actual signal output, minus the noise, sometimes referred to as reset noise which is generated during sense node reset in the pixel.

As mentioned above, issues arise in seeking wide dynamic range of sensing systems. A wide dynamic range encompasses light levels from very low to very high. The signals from the low levels need amplification and the signals from the high levels may need to be reduced to allow the image processor to differentiate between objects in a sensed. However, at the low levels introduction of noise may cause problems in the data interpretation, as the noise can overwhelm the signal. Controlling the gain applied to an output circuit can alleviate these issues.

Figure 3:
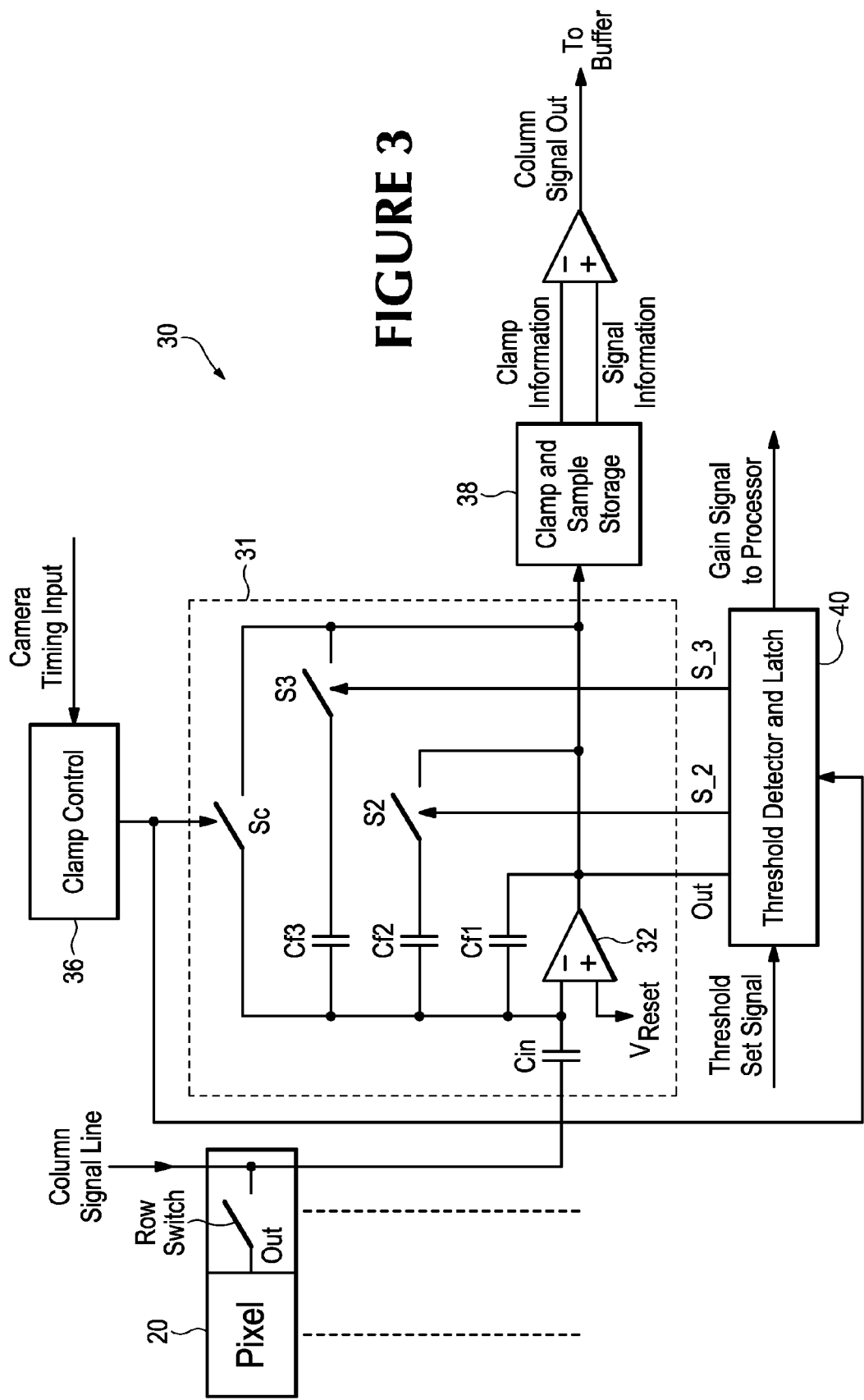
FIG. 3 shows an embodiment of readout circuitry for a CMOS imager having signal dependent gain switching.

FIG. 3 shows an embodiment of readout circuitry 30 that allows for control of the gain by introducing gain switching into the output path. The gain switching is achieved by introducing feedback capacitors as needed into the feedback paths. The programmable gain amplifier 31 receives as an input from the output of the pixel 20. When the row signal selects the pixel 20, the output of the pixel OUT is connected to the gain switching amplifier.

Initially, the clamp control 36 closes the clamp switch Sc during an initial fraction of the pixel clamp shelf period. This causes amplifier 32 to become a unity gain buffer and pulls the end of Cin connected to amplifier 32 to the Vreset voltage, a known condition. Then clamp control 36 opens switch Sc and the later part of the clamp shelf signal has gain re-applied and pixel reset noise has been almost fully removed from the clamp shelf at the output of amplifier 32. The feedback clamp circuit has Cin reset noise which is much lower than the pixel. This noise is now added to the signal at the output of amplifier 31. The output with Cin reset noise is then sampled and stored in the clamp and sample storage.

After the clamp shelf with removed pixel reset noise is stored in Camp and Sample Storage 38 the signal charge is transferred from pinned photo diode 22 to sense node 28. This causes a change in sense node voltage and initiates the start of the clamp shelf. The voltage change due to signal on the sense node is applied to the signal column to the input end of Cin attached to the signal line resulting in an equal change at the output of Cin which is connected to the (−) input of amplifier 32. The transition from clamp shelf to signal shelf at the output of amplifier 32 is not instantaneous due to bandwidth. If, during the time the signal on the first feedback path approaches the rail voltage, meaning the amplifier is near saturated, the threshold detector 40 will close switch S2 which reduces gain of amplifier 31.

Once the switch is closed during a read out of a particular pixel, it must remain closed. Otherwise, when the capacitor Cf2 enters the path, the voltage will drop, and 'unsaturate.' This would trigger the switch S2 to be opened, which in turn would cause the signal to saturate again, resulting in a continuous loop of up and down signal levels. The signal shelf output with gain selected by signal amplitude is stored along with the clamp shelf in Clamp and Sample Storage 38. The sample shelf has the same Cin reset noise value as the clamp shelf. Therefore the Cin reset noise can be later subtracted when taking the difference between the clamp and sample shelf which represents the signal amplitude.

Figure 4:
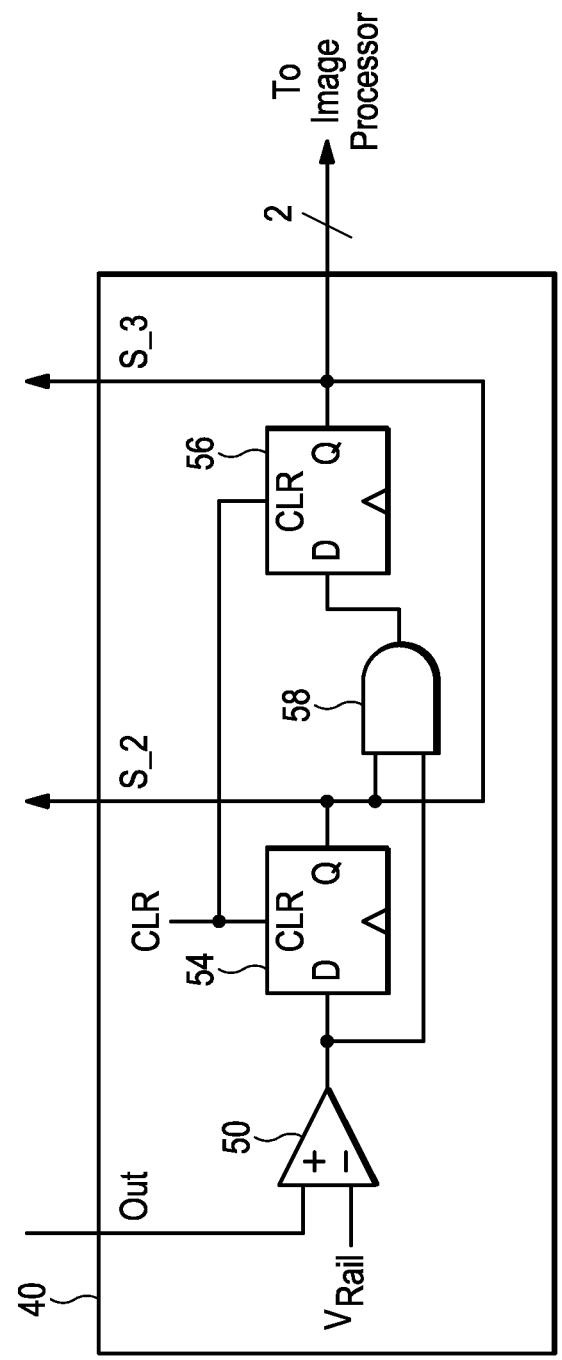
FIG. 4 shows an embodiment of a threshold detector and latch.

In one embodiment, the threshold detector and latch would consist of one or more comparators, such as the embodiment shown in FIG. 4. The output voltage signal OUT of the amplifier 32 is compared to a voltage Vrail at a first comparator 50. At the start of the pixel read cycle the Q terminals of 54 and 56 are set to the false state by the CLR signal. When the output signal OUT reaches the voltage Vrail, the output of the comparator signal S_2 becomes true. As mentioned above, the signal is latched by latch 54, and causes the switch S2 to close. The threshold voltage Vrail is preferably set so signals somewhat lower than the point of amplifier 32 saturation cause the gain to be reduced before serious nonlinear response is reached.

If the output signal continues to grow, such that OUT reaches the rail voltage again, the comparator 50 would output a signal S_3 to close switch S3 in FIG. 3. Use of a logic gate such as 58 may allow control such that signal S_3 only switches closed to bring in capacitor Cf3 when the output saturates after capacitor Cf2 has already been added to the feedback path. Similar to the signal S_2, the signal S_3 will be latched by latch 56 to ensure that the output remains stable with the feedback capacitor Cf3 staying in the path.

One must note that the comparator can send the switch closing signals when the output signal nears saturation, rather than waiting until the signal actually saturates. The signals to close the switch or switches may also occur relatively early in the time period of the signal building. Analog signals often have a 'shelf' or level they reach and then increase very little beyond that during the time period. In this manner, the readout circuitry applies variable gain to the pixel outputs. This allows lower intensity signals resulting from lower light levels to have high gain applied, with lower levels of gain applied depending upon the signal. This increases the dynamic range of the sensing system.

Returning to FIG. 3, once the system has settle and has applied the gain of whatever level, the latch in Threshold detector and latch 40 sends a signal that contains two bits of information identifying the amount of gain applied. For example, if the two switches S2 and S3 are not closed, the output of the threshold detector would be 00. If switch S2 is closed, the output of the threshold detector would be 01. If switch S3 closes, it means that switch S2 has already closed, so the output would be 11. This information is transferred to an image processor that is processing the resulting output signals.

The output signals are sent to the image processing after they have been digitized by the analog-to-digital converter (ADC) shown in FIG. 1. The output of the amplifier 32 is sampled and stored at 38. As mentioned previously, the output is generally taken using CDS, so the clamp sample taken after the sense node was reset but prior to the signal being allowed at the sense node is subtracted from the sample information and the resulting output is send onto a buffer just prior to the ADC. This process removes Cin reset noise due to clamping and reduces 1/f noise mainly generated by the pixel source follower 29. Ultimately, after going through the ADC, the signal will be sent to an image processor that will use the gain information and the signal to reconstruct the image sensed by the pixels of the pixel array.

Several variations and other embodiments of gain switching in the output path of the pixels exist. The embodiment of FIG. 3 shows three levels of gain, where gain equals the ratio of the input capacitor divided by the feedback capacitor. In the first instance, where the other two gain paths are not switched in, the gain is the highest. When the feedback path of Cf2 switches in, the gain is at a middle level, and when the feedback path of Cf3 switches in, the gain is the lowest. Other combinations and levels of gain can be applied. For example, the system could switch between two, four, five, etc., levels of gain, limited only by the response time needed and the available area on the chip.

Figure 5:
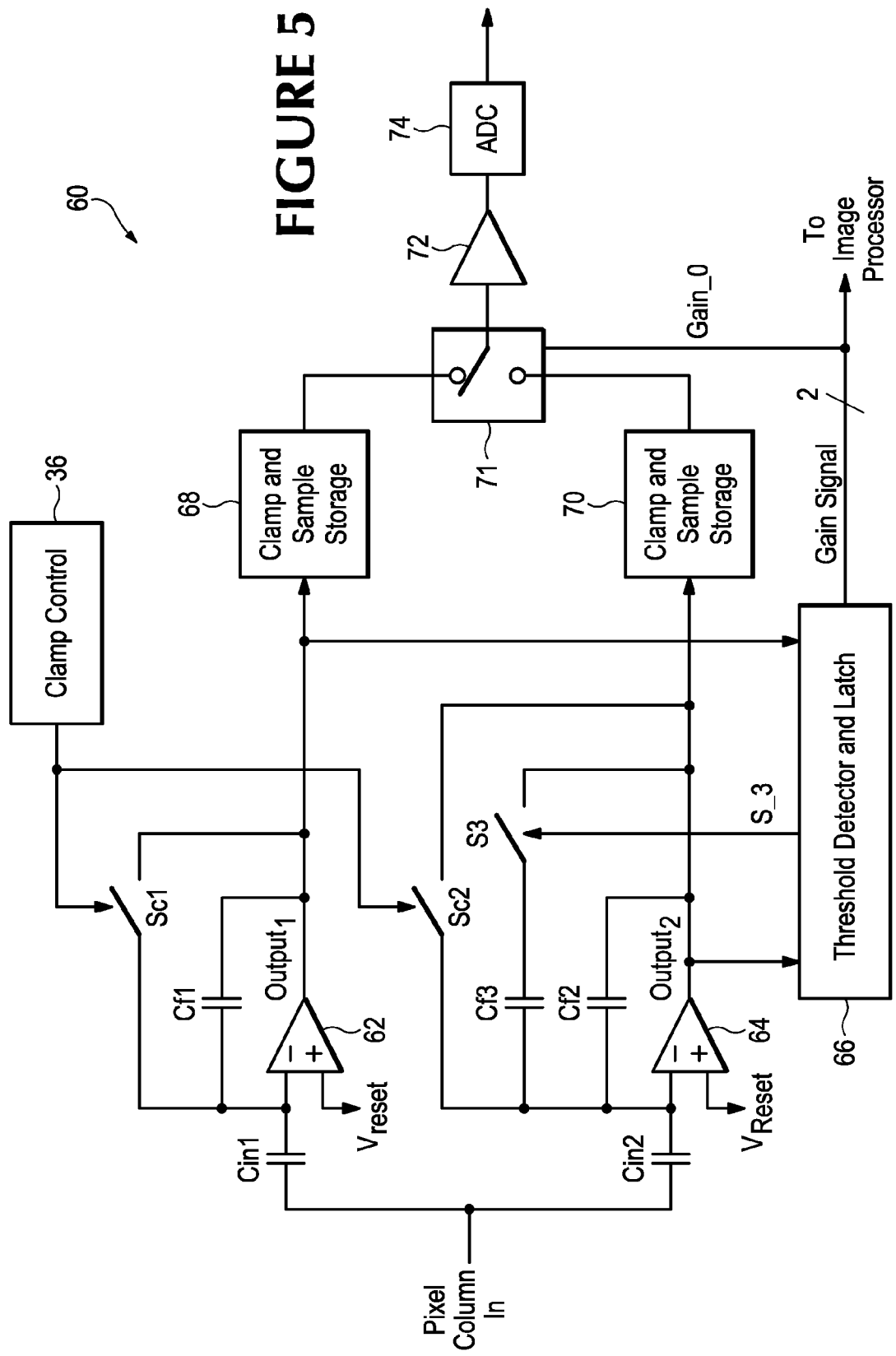
FIG. 5 shows an alternative embodiment of readout circuitry for a CMOS imager having gain switching.

Another possibility is to use one gain path that is clean and relatively noise free, with the other one having the gain switching. With relatively low light levels, the desire exists to keep the noise levels as low as possible to maintain a good signal to noise (S/N) ratio. Using extra capacitors in the feedback paths makes the output relatively noisy resulting from time delay to settle during and after gain switching. This reduces the time for the valid sample shelf and therefore increases noise. One approach would be to have the high gain path separated from the medium/low gain path, wherein the medium/low gain path employs gain switching. FIG. 5 shows an example.

In FIG. 5, the pixel column in signal goes to different paths. The upper path consists of the high gain, low noise path. In this embodiment there are two input capacitors Cin1 and Cin2, one for each path. The upper path has an amplifier 62, typically a programmable gain amplifier, but other components are possible. The amplifier has as one input the reset voltage and the pixel column in signal as the other. The clamp control 36 connects to both paths, allowing the amplifiers to be reset and input capacitor clamped as needed as previously discussed.

The threshold detector and latch operates similarly to the one in FIG. 3, but receives the output from both the fixed gain path amplifier 62 and the variable or gain switching path amplifier 64. If the output of the fixed gain path does not saturate, the medium/low gain path of amplifier 64 may not be used. An output signal is still produced but not used.

One should note that the medium/low gain path is shown having only one switch, but two switches could also be used. In this embodiment, the default arrangement is to have one feedback capacitor Cf2 in the circuit continuously, with the option to switch in the third feedback capacitor Cf3 to move to the low gain path. The gain signal in this instance would again consist of two bits. The first bit indicates whether the high gain path is used or not, and the second bit indicates whether the medium or low gain path is used. If the bit for the high gain path is set, the other bit becomes a "don't care" since the useful information is that the high gain path output is the desired output.

Figure 6:
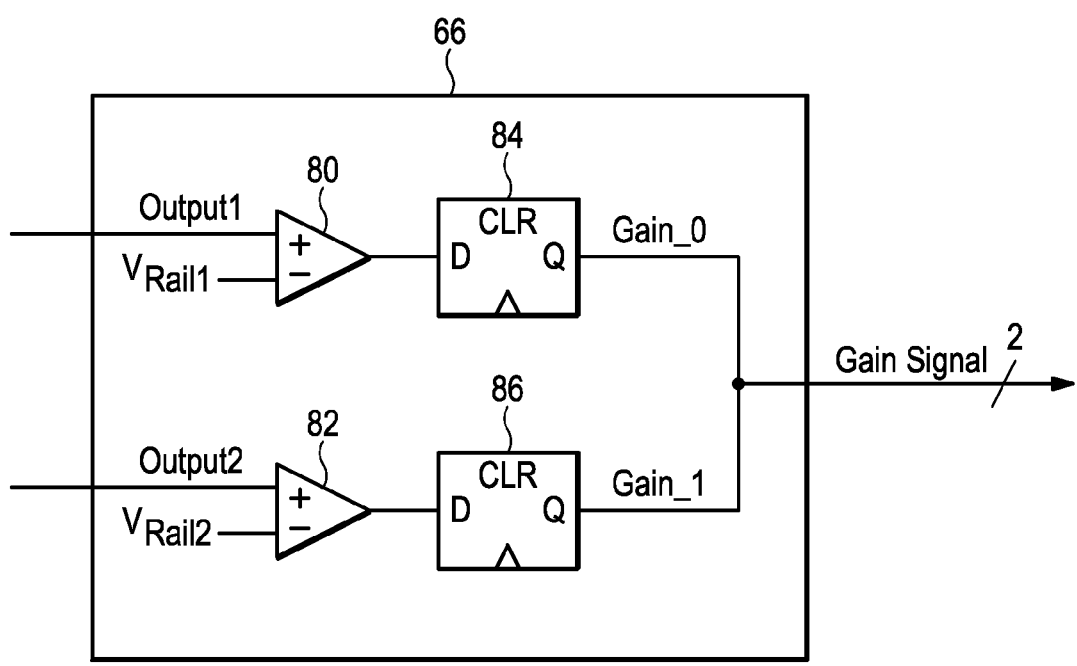
FIG. 6 shows an embodiment of a threshold detector and latch for readout circuitry for a CMOS imager having gain switching.

In the embodiment of FIG. 5, two clamp and sample storages 68 and 70 are used. One could also be used, no limitation to any particular configuration of storage is intended by this nor should any be inferred. If two are used, the gain signal output of the threshold detector 66 may be used to determine which signal is sent to the buffer 72 and ultimately to the ADC 74. A more detailed view of an embodiment of a threshold detector and latch for a CMOS imager having gain switching is shown in FIG. 6. The threshold detector 66 has as its inputs the output signals OUTPUT1 and OUTPUT2, where OUTPUT1 is the output of the high gain path and OUTPUT2 is the output of the gain switching path. OUTPUT1 enters the threshold detector and latch 66 at differential amplifier 80 that has as its other input Vrail1, which would be set at a level corresponding to the saturation level of the amplifier 62 in FIG. 5. If OUTPUT1 passes the level of Vrail1 the output of the amplifier 80 will become true. The resulting signal will be latched by latch 84 and become the first bit of the gain signal from 66 in FIG. 5 GAIN_0.

Similarly, OUTPUT2 enters the threshold detector and latch at 66 at differential amplifier 82 that has its other input Vrail2. When the value of OUTPUT2 exceeds the rail signal, the output of the amplifier 82 becomes true. The signal is latched at 86 and becomes the second bit of the gain signal GAIN_1.

Returning to FIG. 6, the first bit of the gain signal controls a switch 71 to select between the high gain path and the gain switching path. If the high gain path is saturated, the switch will flip to select the medium/low gain path and that is the signal that will pass to the buffer 72. If the high gain path is not saturated, the switch will remain as shown and the high gain output will be used. The actual level of the signal does not matter to the switch, all that the switch would react to is the use of the high gain path or not.

The above embodiments apply gain switching to the output signal of a sensing pixel, allowing differing levels of gain to be applied as determined by the signal level. This allows for an increase in the dynamic range of the system while not adding significant numbers of components or increasing the size of the circuitry.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. An imager, comprising:
   an array of pixels arranged in rows and columns;
   readout circuitry electrically coupled to the columns to receive signals from the pixels, the readout circuitry having at least one signal path with gain switching; and
   a threshold detector electrically coupled to the readout circuitry to set a gain to be applied by the readout circuitry, wherein the gain set is based upon the signals from the pixels.

2. The imager of claim 1, wherein the threshold detector has an output signal indicating a gain applied.

3. The imager of claim 2, wherein the threshold detector transmits the output signal indicating the gain applied to one of an on-chip processor and an off-chip processor.

4. The imager of claim 1, wherein the imager further comprising an analog to digital converter coupled to the columns.

5. The imager of claim 1, wherein the imager further comprises a clamp and sample storage coupled to the output path.

6. The imager of claim 5, wherein the imager further comprises a switch coupled to the clamp and sample storage.

7. The imager of claim 1, wherein the readout circuitry comprises one path having gain switching.

8. The imager of claim 7, wherein the one path comprises one programmable gain amplifier.

9. The imager of claim 8, wherein the readout circuitry comprises multiple feedback paths, each path having a feedback capacitor and a switch coupled between an output of the programmable gain amplifier and an input terminal of the programmable gain amplifier.

10. The imager of claim 9, wherein each switch is electrically coupled to a latch.

11. The imager of claim 9, wherein the threshold detector comprises at least one comparator that compares signal levels on the feedback paths to a rail voltage to determine if the signal levels are near saturation.

12. The imager of claim 1, wherein the readout circuitry comprises two output paths, a fixed gain path and a gain switching path.

13. The imager of claim 12, wherein the fixed output path comprises a programmable gain amplifier having a feedback capacitor selected to apply a preset gain.

14. The imager of claim 12, wherein the gain switching path comprises a programmable gain amplifier having two output paths, each path having a feedback capacitor.

15. The imager of claim 14, wherein each switch is electrically coupled to a latch.

16. The imager of claim 9, further comprising a reset switch electrically coupled between the output and the input of the path having gain switching.

* * * * *